Nov. 11, 1924.
W. A. WILKINS
ANIMAL TRAP
Filed July 20, 1920
1,515,083
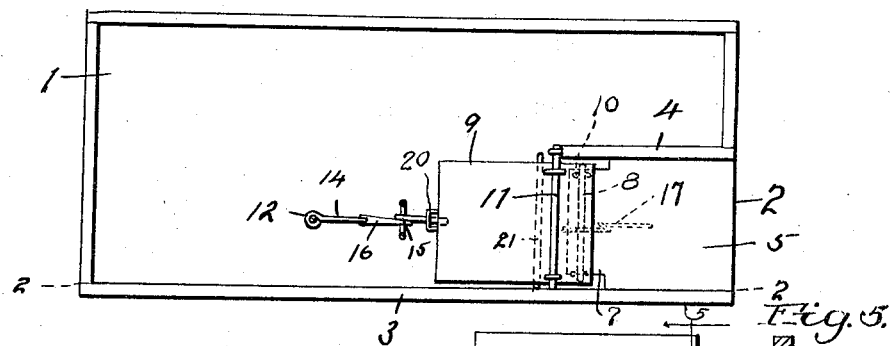
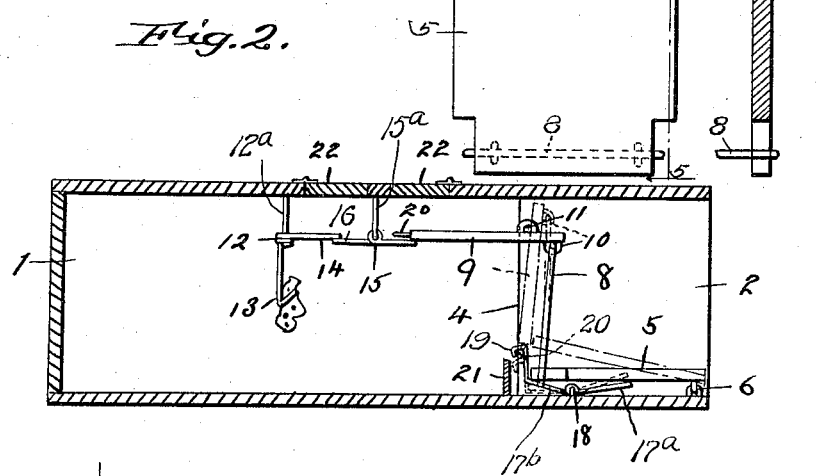
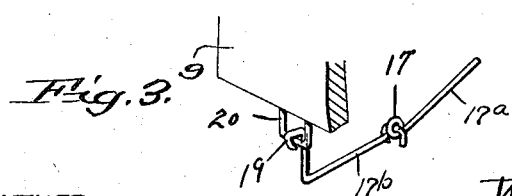
WITNESS
Gerald Hennesy
Frank D. O'Connell
Willie A. Wilkins
INVENTOR.
BY
Richard B. Owen
ATTORNEY.

Patented Nov. 11, 1924.

1,515,083

UNITED STATES PATENT OFFICE.

WILLIE A. WILKINS, OF TALLULA, MISSISSIPPI.

ANIMAL TRAP.

Application filed July 20, 1920. Serial No. 397,644.

*To all whom it may concern:*

Be it known that I, WILLIE A. WILKINS, a citizen of the United States, residing at Tallula, in the county of Issaquena and State of Mississippi, have invented certain new and useful Improvements in Animal Traps, of which the following is a specification.

This invention relates to animal traps and has for its primary purpose to provide a trap which is designed for quick and efficient operation whereby the animal is lured into the trap so as to be securely and safely lodged therein without any possibility of escape.

A further object of the invention resides in the provision of automatically operated means for closing the entrance of the trap after the animal has passed therethrough, this means being so connected and arranged as to be instantaneously operated upon movement of the bait holder.

With the above and other objects in view, the invention may be said to reside generally in the details of construction, combination and arrangement of parts, as will be hereinafter more fully pointed out and described, reference being had to the drawings wherein—

Figure 1 is a plan view of the invention with the top of the cage removed.

Figure 2 is a vertical longitudinal section.

Figure 3 is a fragmentary detail view of the spring door-latch.

Figure 4 is a plan view of the platform and

Figure 5 is a view taken on line 5—5 of Figure 4 looking in the direction of arrows.

The cage 1 may be constructed of solid wood or metal and of any desired shape and form suitable to provide an adequate housing for the trapped animal. At one end of the cage an entrance 2 is provided which opens into a passageway formed between the side wall 3 of the cage and the inner partition 4. Arranged in this passageway is a platform 5, one end of which is hinged as indicated at 6 adjacent the opening 2 so that it is free to swing upwardly as shown by the dotted line structure of Figure 2. The inner end of this platform is provided with a reduced portion 7 which rests in a swing or loop member 8 carried by the door 9 when the door drops to its closed position. This loop may be in the form of a U-shaped wire having its terminal ends pivotally connected to the door as at 10 and extending downwardly and under the reduced portion 7 of the platform so as to provide a support for the same, being either disposed loosely thereunder or pivotally connected to the platform as may be desired. The door 9 is adapted to swing from a supporting rod 11 extending across the inner end of the passageway, being supported by the wall 3 and partition 4 as shown in the drawings. When operated so as to swing downwardly, this door completely closes the passageway and prevents any escape from the trap.

To operate the door, a suitable trip mechanism is provided and consists first in a trigger device 12 which may be formed of wire bent to provide angularly extending members forming respectively a bait holder 13 and a trigger finger 14. This trigger member is designed to be suspended by the hanger 12$^a$ from the top wall of the trap in direct line with the passageway so that the bait is clearly visible through the passageway from the outside of the trap. This would of course, be probably necessary only when the trap is in the form of a closed casing, with a solid wall, although this location is particularly desirable because of its effectiveness in guiding and inducing the animal through the trap entrance. Arranged between the trigger device and the door 9 is a stay member 15, likewise suspended from the top wall of the trap by means of a link 15$^a$ and formed preferably of a wire bent to provide oppositely projecting portions which are adapted to engage under the door 9 and trigger finger 14 respectively as illustrated. The end of the stay engaging the trip finger is preferably made flat as indicated at 16 to engage the trigger mechanism to be adequately set for operation, it being evident that the slightest movement of the bait holder 13 will tend to throw the finger 14 out of engagement with the stay member and thus release the draw or drop 9. The trigger 12, it is to be here understood is of course loosely engaged with the supporting hanger 12$^a$ so as to be capable of lateral swinging movement whenever the bait holder is disturbed.

The dropping of the door 9 would ordinarily tend to seal the passage and prevent any escape from the trap, but in order to circumvent animals of a more cunning nature, the door may be more positively locked and held in place by means of a spring latch 17. This latch is adapted to be arranged on a pivot, as indicated at 18 and located upon the floor of the trap and underneath the platform 5 as illustrated, the end 17ª of the latch extending upwardly from one side of the pivot to bear against the under part of the platform while the opposite end 17ᵇ projects inwardly and upwardly beyond the terminal end of the platform and carries a hook 19. This hook is to catch onto the loop 20 fastened to the end of door 9. It is to be here noted that the hook 19 is normally held in a raised position by reason of the bent rear portion of the latch. Consequently as the platform is raised the hook is permitted to descend. When the door 9 descends, the loop 20 slides over the hook 19, thereby securely holding the door in a locked position, as is clearly illustrated in Figure 3 of the drawing. The movements of the various parts, however, are so regulated that the door 9 is permitted to drop downwardly in sufficient time to permit the loop 20 to be engaged by the depending hook. A strip, indicated at 21 is placed toward the end of the passage, in front of the latch so as to prevent any tampering with the same. Access to the interior of the trap for the purpose of setting the bait, may be afforded through the top by suitable door means 22 as shown.

When set, the various parts of the trap are about as shown in full lines in Figure 2 of the drawing. The stay 15 supports the free end of the door 9 and the trigger finger 14, leaving the passage or entrance to the trap clear and the bait clearly visable therethrough. As the rodent or other animal passes into the trap and attempts to seize the bait, the consequent movement of the trigger disengages the finger from the stay whereupon the latter being unable to longer support the door, releases the same so that the latter swings downwardly to close the passage. The closing of the trap door raises the platform 5 through the medium of the swing 8, causing the hook 19 of the spring latch 17 to engage the loop 20 and lock the door in place The relative position of the door and platform when closed is indicated in dotted lines in Figure 2 and it will there be noted that while the raised end of the platform is above the lower end of the door, the latter rests snugly thereagainst so that consequently there is no possibility of the trapped animal escaping.

While the above may be considered the perferred embodiment of the invention it should be understood that various changes and corrections in regard to the details of construction, design, and arrangement of parts may be resorted to provided they are such as properly fall within the scope of the invention as claimed.

Having thus described my invention what I claim as new and desire to secure by Letters Patent is:—

1. A trap comprising an animal receiving closure having an entrance opening at one end, a hinged platform disposed within the entrance opening, a swinging door and a U-shaped member depending therefrom supporting said platform, a combined trigger and bait holder within the closure, a stay member for retaining the trigger and door in their set position and means below the platform for locking the door when dropped to its closed position.

2. A trap comprising an animal receiving closure having an entrance opening at one end, a hinged platform disposed within the entrance opening, a swinging door having a U-shaped member depending from one end for supporting said platform and a loop carried at its opposite end, a combined trigger and bait-holder for retaining the door in open position and a latch pivoted beneath the platform for engagement with the loop of the door.

In testimony whereof I affix my signature in presence of two witnesses.

WILLIE A. WILKINS.

Witnesses:
  Mrs. M. Jones,
  Jno. C. Brown.